Sept. 27, 1955     W. E. HUGHES, JR., ET AL     2,718,731
AMPUL CONSTRICTING APPARATUS
Filed Feb. 11, 1953     4 Sheets-Sheet 3
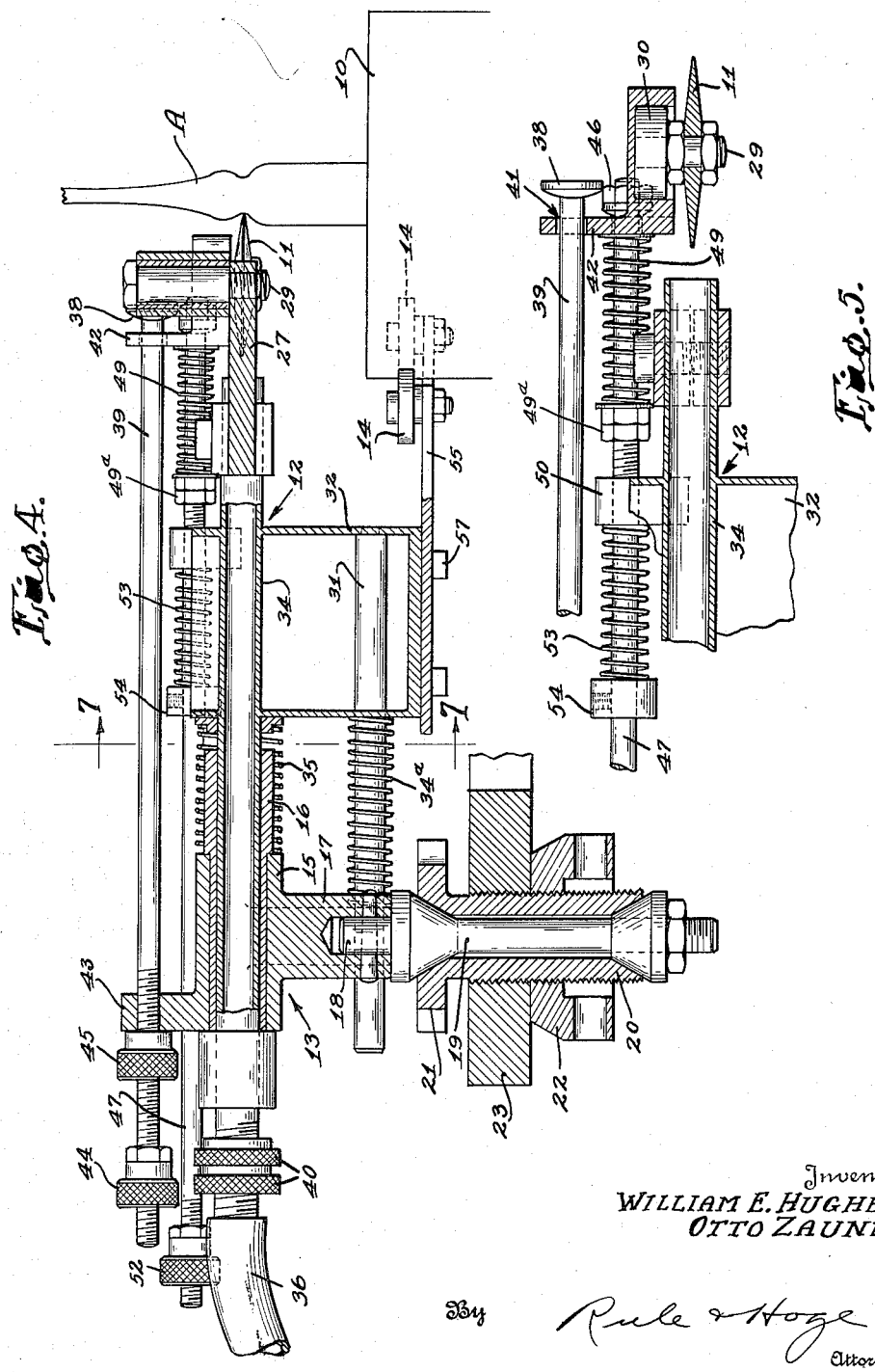
Inventors
WILLIAM E. HUGHES JR.
OTTO ZAUNER

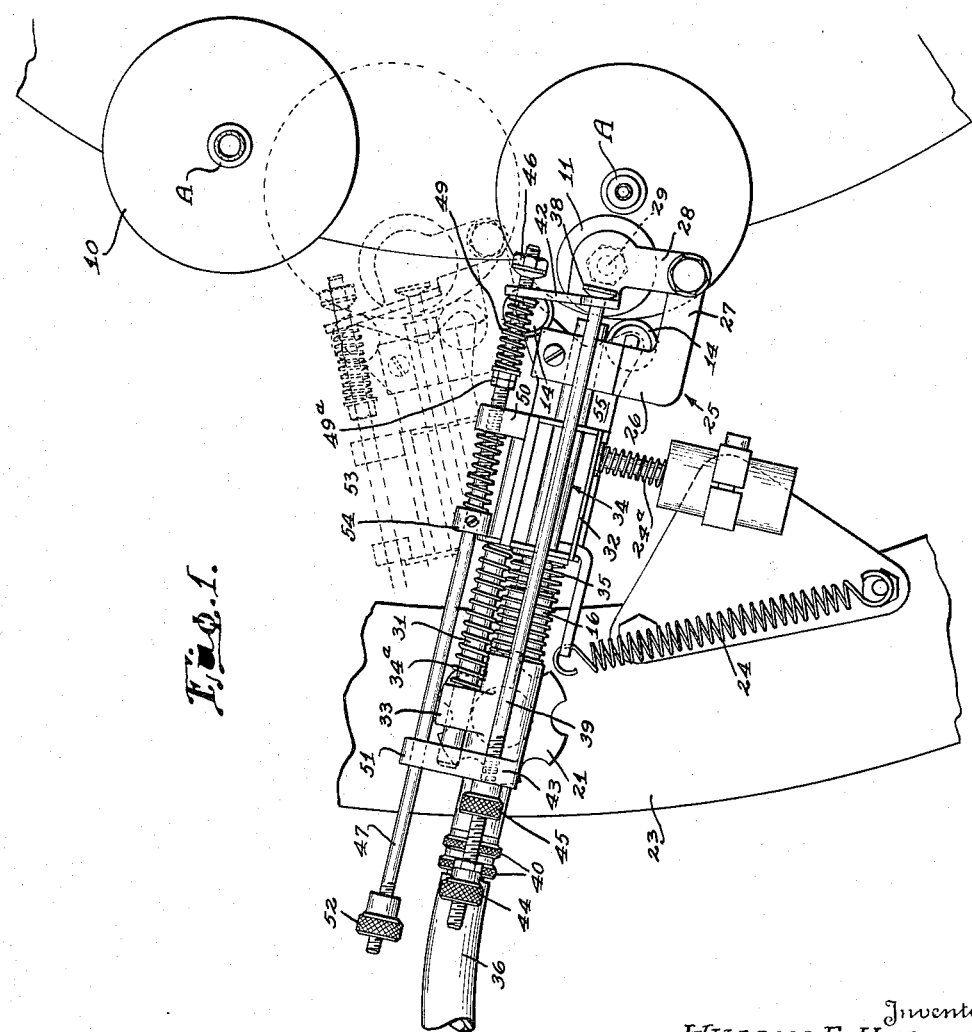

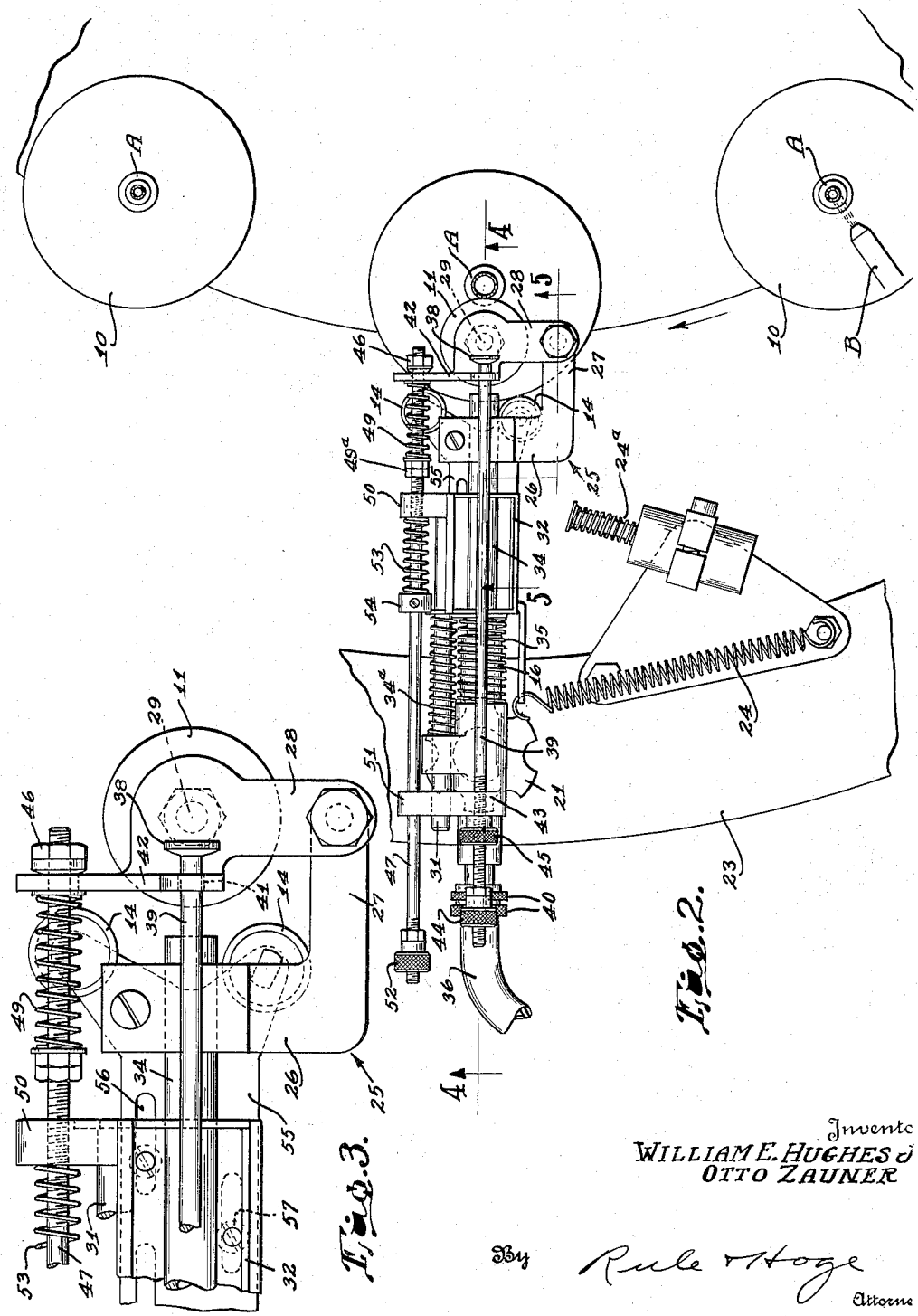

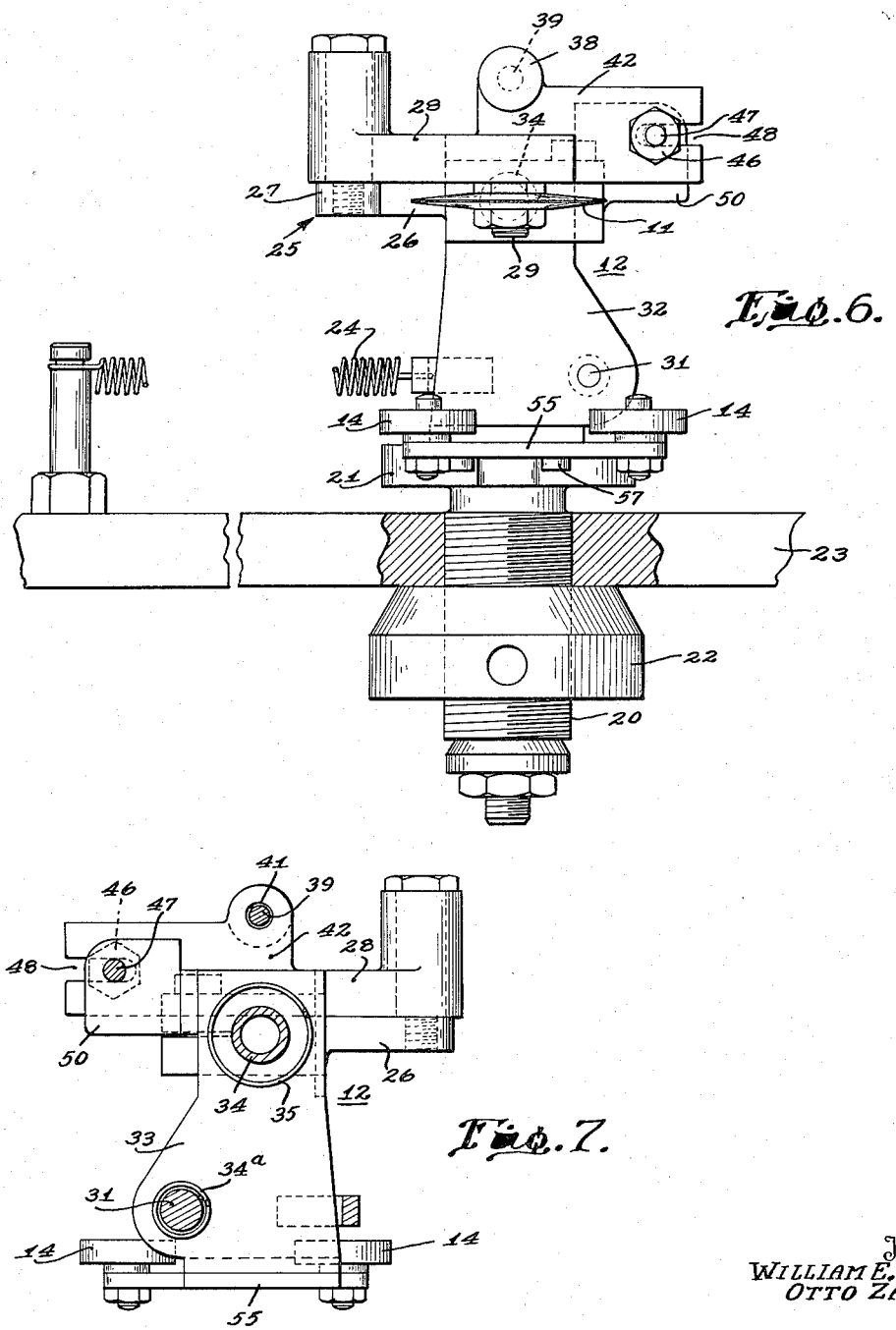

United States Patent Office 2,718,731
Patented Sept. 27, 1955

2,718,731
AMPUL CONSTRICTING APPARATUS

William E. Hughes, Jr., and Otto Zauner, Vineland, N. J., assignors to Owens-Illinois Glass Company, a corporation of Ohio Application February 11, 1953, Serial No. 336,353

18 Claims. (Cl. 49—7)

The present invention relates to ampul forming machines, one commercial type of which is disclosed in Dichter Patent No. 1,962,985 issued June 12, 1934.

The product of such machines is a glass ampul composed of a cylindrical bottomed body having a tapered upper end and an annular constriction intermediate the upper end or shoulder of said body and the tapered end. It is important that this constriction be properly formed and concentric with the axis of the ampul. Also the depth of the constriction should be uniform and such that the internal diameter is within certain prescribed maximum and minimum limits.

In the machine shown in the above patent, the constriction is initially formed by means of a flame which is concentrated upon a selected previously softened area of the glass tube, as it rotates about its axis with the supporting chucks. A fixed rib 86 constituting a part of the machine, is provided to regulate the depth of and impart final shape to the constriction. In other machines a stationary rib, or plate, common to all of the chucks, is arranged at one side of the machine in such position that the ampuls with the constrictions partially formed by a flame successively engage the plate.

Neither of these methods and apparatus is satisfactory because of the fact that it is practically impossible to so mount these chucks as to insure their uniform positioning in relation to a fixed independently supported constricting plate. As a consequence, the constricting plate, or rib over-constricts some ampuls, under-constricts others and in other instances forms constrictions which are excessively off-center, or mis-aligned in relation to the bodies.

It is an object of our invention to overcome these objections and to this end we have provided a constricting device which is common to all of the chucks and operated directly by these chucks in such fashion that it cannot fail to engage and uniformly constrict the glass tubes, regardless of any normally minor inaccurate positioning of the chucks relative to the axis of the machine.

According to our invention, a constricting disk is mounted upon a support exterior to the horizontal circular path of travel of the chucks. This support is movable horizontally to engage the constricting disk with a preheated softened area of a glass tube, or ampul. The chucks actuate the mechanism which causes projection of the disk into the partially formed constriction. Moreover, the chuck and constricting mechanism are releasably interlocked during a predetermined degree of travel of the former, whereby to insure completion of the constriction. Thereupon the mechanism becomes disengaged from the chuck and returns to its former position where it engages the next succeeding chuck. So long as the chucks are of uniform diameter and not too abnormally positioned with respect to the axis of the machine, consistently uniform constriction of the ampuls is assured.

Another object of our invention is the provision in mechanism of the above character, of means for accurately and regulably controlling the depth of constrictions formed thereby.

Other objects will be in part apparent and in part pointed out hereinafter.

In the drawings:

Fig. 1 is a plan view showing a segment of an annular series of chucks of the forming machine and the constricting mechanism in two positions. In full lines the mechanism is shown in the starting position, while in dotted lines, it is shown near the other extreme position;

Fig. 2 is a plan view similar to Fig. 1, but shows an intermediate position of the constricting mechanism;

Fig. 3 is a detail plan view showing the adjusting and control mechanism for the constricting disk;

Fig. 4 is a vertical longitudinal sectional view taken substantially along the line 4—4 of Fig. 2;

Fig. 5 is a vertical longitudinal sectional view taken substantially along the line 5—5 of Fig. 2;

Fig. 6 is an end elevational view with parts in section, taken from the disk-carrying end of the mechanism; and Fig. 7 is a vertical transverse sectional view taken substantially along the line 7—7 of Fig. 4.

The machine with which our invention is primarily adapted for use, may in general, well be that shown in the above patent, to which reference may be had for structural details and operating procedure. The chucks (upper and lower) grip a length of vertically disposed glass tubing and carry same continuously in a circular path through the necessary forming zones. Incident to such travel, the chucks rotate about their individual axes while flames play upon the selected areas of the tubing for the obvious purpose of preheating and softening the glass for elongation, and subsequent constriction.

In the accompanying drawings, we have shown several of the lower clamping chucks 10, but have deemed it unnecessary to detail the associated mechanism, since such is conventional and well illustrated in the patent to Dichter. The chucks we have shown are in, or in proximity to, the constricting zone, and the ampul A illustrated, is in process of being softened by a burner B, of which there may be several.

The constricting mechanism which comprises our invention is illustrated as including a constricting disk 11 freely rotatable about a vertical axis and supported at one end of a frame 12, which is mounted for limited longitudinal movement upon a horizontally swingable support 13. This support is adjustable vertically to thereby set the disk as required by the location of the intended area of constriction with respect to the base chuck 10. The disk supporting mechanism (Fig. 4) is adjusted to determine the innermost operative position of said disk in relation to a pair of rollers 14, which are adapted for rolling engagement with the cylindrical side, or periphery of the chucks, as they move in succession through the constricting zone. Thus, it is apparent that if the chucks are of uniform size and positioned within reasonable limits (but not necessarily precise distances) from the machine axis, the constricting disk cannot fail to consistently effect uniform constriction of the ampuls. Once the disk has been set to produce a constriction of predetermined depth, the circular wall of the chuck assumes control of the movement of the disk into the softened glass.

Specifically, the structure of the illustrated embodiment of our invention is as follows:

The swingable support 13 comprises a horizontal guide 15, a bushing 16 within and extending beyond both ends of said guide and a post 17 depending from the guide. This post is pinned to a stud 18 rising from a vertical shaft 19 which is carried by and rotatable in an externally screw-threaded bearing 20. An adjusting flange 21 and lock nut 22, together provide means for setting the support and therefore the disk 11, at the desired elevation, relative to the base plate 23 and chucks 10.

The frame 12 which directly carries the constricting disk swings in a horizontal plane with the support 13 and reciprocates axially of the guide 15 so that the disk is engaged with the successive glass tubes during travel of the latter through the constricting zone. As explained heretofore, the chucks 10 are releasably interlocked with the frame 12 during the constricting operation. A coil spring 24 (Fig. 1) returns the constricting mechanism to its starting position each time it is released by a chuck incident to movement of the latter beyond the constricting zone. Return movement to the starting position brings the frame into contact with a cushioning device 24ª.

This frame 12 comprises a tube 34 mounted for limited sliding movement in the bushing 16, a major part of this tube being disposed between the guide 15 and the series of clamping chucks 10. The aforementioned constricting disk 11 is mounted upon the inner end of said tube, such mounting consisting of an L-shaped bracket 25, one arm 26 of which is clamped to the end of said tube, while the other arm 27 pivotally carries a finger 28 directly supporting the disk. This disk may be carried by a depending pin or stub shaft 29, the upper end of which is journaled in an anti-friction bearing 30 (Fig. 5), the latter being removably secured to the finger 28 in any preferred manner.

These elements viz., the bracket 25, finger 28, disk 11 and rollers 14, must move only in a horizontal plane. Such is assured by a structure consisting of a rod 31 (Figs. 1, 2, and 7) which is secured to a bracket 32 depending from the aforementioned tube 34 of the frame 12, said rod extending rearward horizontally through a guide 33 (Fig. 7) carried by the post 17. A coil expansion spring 34ª surrounds this rod 31 between the bracket 32 and guide 33 and functions to assist in yieldingly holding the frame 12 in its innermost position relative to the ampul machine. A coil spring 35, encircling the sleeve 16 and confined between the aforementioned guide 15 and the bracket 32 which depends from the tube 34 of the frame 12, cooperates with said coil spring 34ª in projecting the frame and therefore the constricting disk, toward the ampul clamping chucks 10.

Cooling of the constricting disk 11 is necessary and to accomplish this, the tube 34 which is open in proximity to and facing said disk, has its other end connected to a flexible hose 36, leading to a source of cooling air (not shown).

The constricting disk, or wheel 11, normally is positioned as shown in full lines in Fig. 1. That is, the disk is in its retracted position, yet in close proximity to the previously softened shoulder of the ampul or other article being fabricated. Such positioning results from the frame 12 being projected inwardly in consequence of which the finger 28 is moved in a counter-clockwise direction about its pivot. This retracted position of the disk 11 is determined by the setting of a stop 38 on the inner end of an adjusting rod 39 and the position of stop nuts 40 on the tube 34. The adjusting rod 39 is freely movable axially in an aperture 41 formed in a flange 42 carried by the disk supporting finger 28 and is screw-threaded in a bracket 43 rising from the guide 13. A knurled nut 44 is operable to axially adjust the rod and a lock nut 45 holds the rod in the desired position. Thus, the stop 38 may be set as operating conditions and the diameter of the ampul or tube require.

As the mechanism advances with a chuck 10 toward the position shown in Fig. 2, the distance between the axis of the chuck 10 and the axis of oscillation of the mechanism shortens. This results in longitudinal movement of the frame 12 in the bushing 16 and guide 15 toward the axis of oscillation. Incident to such movement, the bracket 25 of course travels with the frame in consequence of which, the disk carrying finger 28 moves clockwise about its vertical pivot and gradually advances the constricting disk toward and into the wall of the ampul to constrict the latter. It is also apparent that during this procedure, the distance between the stop 38 and the ampul shortens, permitting the spring 49 to advance the disk toward the ampul.

The extent of advancing movement of the disk and therefore the depth of the constriction produced thereby in the ampul, is regulably controlled by a stop 46 (Figs. 3, 6 and 7) which is carried by an adjusting rod 47, the latter extending through a slot 48 in horizontal extension of the flange 42. A coil spring 49 on this rod 47, exerts a yielding pressure upon said slotted extension of the flange 42, tending to advance the disk. An adjusting nut 49ª regulates the position and pressure of the spring upon the extension of said flange 42. The adjusting rod 47 for the stop 46 is threaded in a bracket 50 and extends through a guide 51. At its outer end, this rod carries an adjusting nut 52. Holding of this rod against accidental rotation, which would alter the setting of the stop 46, is obtained by means of a coil spring 53, bearing against the bracket 50. A collar 54 is adjustable to determine the effectiveness of this spring.

From the foregoing it will be apparent that the stop 38 immediately above the disk 11 (Figs. 1, 2, and 3) prevents premature advancing movement of the disk toward the ampul under influence of the spring 49 and is adjustable to hold the disk quite close to the latter preparatory to projection into contact with the glass. As the mechanism moves from the position of Fig. 1, to that of Fig. 2, the distance between the stop 38 and axis of the chuck 10 decreases and the spring 49 gradually moves the disk carrying finger clockwise about its vertical pivot. Thus, this disk progressively forms and deepens the constriction to the degree determined by the adjusted position of the stop 46.

Movement of the mechanism with the chuck continues until substantially the dotted line position of Fig. 1 has been reached. Shortly thereafter, the chuck moves out of engagement with the rollers 14, whereupon the spring 24 returns the unit to the full line position of Fig. 1 preparatory to being picked up by the next succeeding chuck.

The rollers 14, of which there are two (Figs. 2, 3, and 6), are mounted upon an arm 55 which is adjustable lengthwise of the frame. Such adjustment is provided by means of slots 56 and screws 57. This adjustment is necessary to compensate for differences in the size of the chucks and spacing of these chucks 10 relative to the axis of oscillation of the constricting mechanism.

It also is apparent that this constricting mechanism may be utilized to perform the entire constricting operation or if desired, used to complete a constriction which has been initially or partially formed by a flame, or flames which are directed against the glass tubes while rotating with the clamping chucks.

Modifications may be resorted to within the spirit and scope of the appended claims.

We claim:

1. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, and mechanism actuated by contact with and in response to movement of the chucks into and through said zone for operatively positioning said disk relative to the softened area of the ampuls whereby to produce an annular constriction in each such ampul.

2. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, and mechanism actuated in response to movement of the chucks into and through said zone for operatively positioning said disk relative to the softened area of the ampuls whereby to produce an annular constriction in each such ampul, said mechanism including a support mounted for oscillation about a fixed vertical pivot, a frame carried by said support and oscillating therewith, said frame also being movable radially under control of the chucks to cause the constricting disk to travel with successive chucks through said arcuate path, spring means positioning the frame whereby said chucks successively engage and move the frame both radially and about said pivot with the support.

3. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, mechanism for moving the disk toward and away from the axis of the ampuls, and means whereby the successive chucks actuate said mechanism incident to their entry into and movement through said zone.

4. In an ampul forming machine comprising a series ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, mechanism for moving the disk toward and away from the axis of the ampuls, means whereby the successive chucks actuate said mechanism incident to their entry into and movement through said zone, and means for regulably controlling the extent of movement of the disk toward the ampuls.

5. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, mechanism for moving the disk toward and away from the axis of the ampuls, means whereby the successive chucks actuate said mechanism incident to their entry into and movement through said zone, and means for regulably controlling the extent of movement of the disk toward and away from the ampuls.

6. In combination, means for supporting and carrying a length of glass tube through a constricting zone, said means supporting the tube in a vertical position and rotating said tube about its axis, heating means for softening an area of the tube, means for forming an annular constriction in the softened area of the tube comprising a constricting disk freely rotatable about its axis in a horizontal plane, and mechanism supporting the disk and operable by contact with and in response to movement of the tube carrying means for operatively positioning the disk in relation to the tube.

7. The combination recited in claim 6 wherein the disk supporting and operating mechanism includes a horizontally movable frame, spring means normally urging the frame toward the path of travel of the tube carrying means, a horizontally swingable finger connecting the disk and frame, and means whereby inter-engagement of the frame and tube carrying means and travel of same together, moves the frame in opposition to the spring means and moves said finger to thereby operatively position the disk.

8. The combination recited in claim 6 wherein a horizontally swingable finger directly carries the constricting disk, and the mechanism includes means operable by engagement with the tube carrying means for moving the swingable finger to thereby advance the disk to an operating position.

9. The combination recited in claim 6 together with means for regulably controlling the final operating position of the disk.

10. The combination recited in claim 6 together with an adjustable stop for determining the final operating position of the disk and an adjustable stop for determining the initial position of the disk.

11. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, a horizontal frame, means pivotally mounting the disk upon one end of said frame, said frame mounted for oscillatory movement about a fixed vertical axis at one side of the path of travel of the chucks and horizontal radial movement relative to said axis, spring means normally urging the frame away from said axis, means on said frame to engage and releasably lock the latter with successive chucks under pressure of said spring means, and mechanism actuated by engagement of the chucks with said frame and travel of same into and through the constricting zone for advancing the constricting disk into contact with an ampul.

12. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantially horizontal plane, a horizontal frame, means pivotally mounting the disk upon one end of said frame, said frame mounted for oscillatory movement about a fixed vertical axis at one side of the path of travel of the chucks and horizontal radial movement relative to said axis, spring means normally urging the frame away from said axis, means on said frame to engage and releasably lock the latter with successive chucks under pressure of said spring means, and mechanism actuated by engagement of the chucks with said frame and travel of same into and through the constricting zone for advancing the constricting disk into contact with an ampul, and an adjustable stop for regulably controlling the extent of advancing movement of said disk.

13. In an ampul forming machine comprising a series of ampul supporting chucks mounted for movement in a horizontal arcuate path through a constricting zone, said chucks supporting ampuls with their axes extending vertically, means for heating and softening a selected area of the ampuls prior to entry into said zone, said chucks rotatable about their individual vertical axes; the improvement which comprises a constricting disk freely rotatable about its axis in a substantial horizontal plane, a horizontal frame, means pivotally mounting the disk upon one end of said frame, said frame mounted for oscillatory movement about a fixed vertical axis at one side of the path of travel of the chucks and horizontal radial movement relative to said axis, spring means normally urging the frame away from said axis, means on said frame to engage and releasably lock the latter with successive chucks under pressure of said spring means, mechanism actuated by engagement of the chucks with said frame and travel of same into and through the constricting zone for advancing the constricting disk into contact with an ampul, an adjustable stop for regulably controlling the extent of advancing movement of said disk, and a spring for urging the disk mounting means and disk toward the stop.

14. The structure defined in claim 1 together with means whereby the chucks move said mechanism in one direction through the constricting zone and spring means for reversing the direction of movement of said mechanism upon completion of the constricting operation.

15. The structure defined in claim 1 together with means whereby the chucks move said mechanism in one direction through the constricting zone and spring means for reversing the direction of movement of said mechanism upon completion of the constricting operation, and a cushioning device with which the mechanism is brought into contact by said spring means.

16. Mechanism of the character described comprising a support mounted for horizontal swinging movement through a predetermined angle about a fixed vertical axis, a frame slidable horizontally on the support toward and from said axis, a constricting disk freely rotatable about its axis in a horizontal plane, a pivoted finger mounting the disk upon one end of said frame, spring means urging the finger and disk outwardly away from the frame, a stop for regulably controlling the final extent of such movement of the finger and disk and a stop carried by the support for determining an initial positioning of the disk.

17. The mechanism defined in claim 16 wherein the last named stop is mounted upon the swingable support and the mounting includes an adjusting rod for setting the stop in any desired position.

18. The mechanism defined in claim 16 wherein the first named stop includes an adjustable nut mounted on the frame and an extension on the pivoted finger engageable with said nut.

References Cited in the file of this patent

UNITED STATES PATENTS

| | | |
|---|---|---|
| 1,962,985 | Dichter | June 12, 1934 |
| 2,110,327 | Dichter | Mar. 8, 1938 |

FOREIGN PATENTS

| | | |
|---|---|---|
| 262,746 | Switzerland | July 31, 1949 |
| 423,419 | Great Britain | Jan. 31, 1935 |